Jan. 19, 1926. 1,570,477
C. A. GODSHALK
LOCKING MECHANISM FOR THE SPARE TIRES OF AUTOMOBILES
Filed Sept. 8, 1924

Inventor
Clarence A. Godshalk
By John S. Barker
Attorney

Patented Jan. 19, 1926.

1,570,477

UNITED STATES PATENT OFFICE.

CLARENCE A. GODSHALK, OF PHILADELPHIA, PENNSYLVANIA.

LOCKING MECHANISM FOR THE SPARE TIRES OF AUTOMOBILES.

Application filed September 8, 1924. Serial No. 736,554.

*To all whom it may concern:*

Be it known that I, CLARENCE A. GODSHALK, a citizen of the United States, residing at Philadelphia, in the county of Philadelphia and State of Pennsylvania, have invented certain new and useful Improvements in Locking Mechanism for the Spare Tires of Automobiles, of which the following is a specification.

It is common practice to support a spare tire for an automobile and its demountable rim, upon a carrier located at the rear or the side of an automobile, to which the said rim is fitted and on which it is held by clamping means of one sort or another that are secured by a pad lock or other form of key-operated lock. This arrangement offers a certain amount of protection against theft of the spare tire, but skillful thieves have been able to circumvent the security offered by locking devices of this character, and it has followed that locking means such as referred to have been supplemented or superseded by the use of a chain that is caused to encircle the tire and some fixed part of the car, the ends of the chain being secured together by a lock. A loose chain, however, has features that are undesirable or objectionable to many users of automobiles.

My present invention has for its object to provide tire securing and locking means having the advantages of both the forms of lock that have been referred to, and which besides is simple in construction, offers great security against theft and unauthorized removal of the spare tire, is noiseless in that it does not rattle, has no loose or swinging parts, and in which the several tire securing and locking elements are held together and in place by a single key-operated lock.

In the accompanying drawings—

Figure 1:
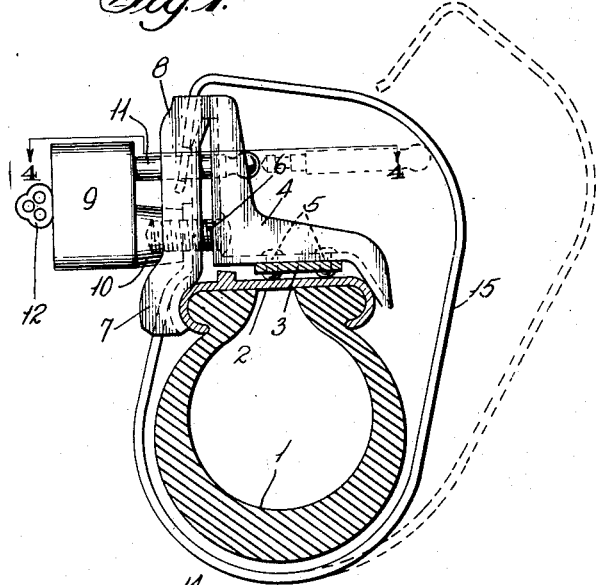
Figure 1 is a cross sectional view through a spare tire and tire carrier showing my improved locking means in side elevation.
Figure 2:
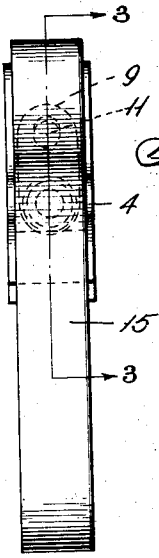
Fig. 2 is a front elevation of the locking means.
Figure 4:
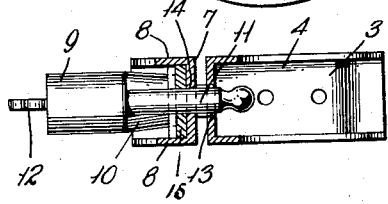
Fig. 4 is a horizontal sectional view on the line IV—IV of Fig. 1.
Figure 3:
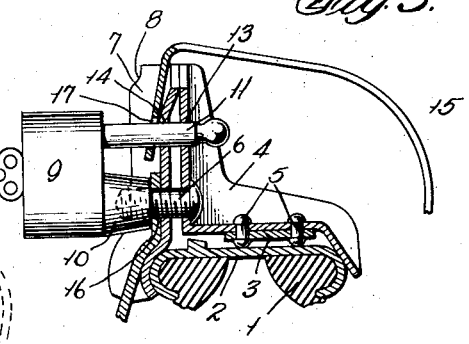
Fig. 3 is a vertical sectional view on the line III—III of Fig. 2.

Referring particularly to Figs. 1 to 4 of the drawings, 1 designates the spare tire supported upon a rim 2 that in turn is mounted upon the tire carrier 3, which may be located at the rear of the automobile or upon the running board thereof. This tire carrier includes a bracket fitting 4 represented as being secured to the part 3 by bolts 5. A bolt 6, preferably screw-threaded at its outer end, extends outward from the base of the upright portion of the bracket 4, that is, the portion that is radial with reference to the curved carrier 3. A holding piece or clamp 7 fits over the bolt 6 and is secured against the outer face of the upright part of the bracket 4 where it is held by some locking means, such holding piece engaging with the outer circumferential edge of the rim 2 on which the tire is supported.

The parts thus far described are of well known construction and are standard equipment upon many makes of automobiles.

I prefer that the clamp or holding piece 7 be formed of channel-bar metal so as to have flanges 8 along its opposite edges.

9 indicates the casing of a key-operated lock. It is represented as being formed with a projection 10, that may be integral with the lock casing and which is internally screw-threaded, fitting it to engage with the screw-threaded bolt 6. The extension 10 thus becomes a nut which, when screwed upon the bolt 6, operates to force the clamping member 7 into position to hold the tire and its rim in place on the carrier.

11 indicates a removable pin that is adapted to be inserted into a suitable aperture provided therefor in the lock casing and to be therein securely held by the internal lock mechanism within the casing 9, which is adapted to be operated by the key 12. The character of this lock mechanism is not indicated, as it forms no part of the present invention and may be varied within wide limits. The pin 11 is adapted to pass through an aperture 13 in the bracket 4, and also through a registering aperture 14 in the clamping piece 7, when such piece is made sufficiently long to extend past the aperture 13, as is usually the case.

When the nut 10 is screwed upon the pin 6 sufficiently far to secure the clamping piece in position to hold the tire upon the carrier and to such position that the opening for the pin 11 in the lock casing 9 is in alignment with the apertures 13 and 14, the pin is passed through the said apertures and its end inserted into the lock casing where it is secured by the internal lock mechanism. The pin and the lock thus, through engagement with stationary parts of the tire carrier, securely hold the nut against being turned.

The features just described constitute the subject matter of Patent 1,491,691, dated April 22, 1924, to C. A. Godshalk.

15 designates a band of flexible, although rather stiff, steel, which has been treated to render it exceedingly hard so as to be resistive to the action of cutting tools. It is preferably of a width to fit rather snugly between the flanges 8 of the clamp or holding piece 7. In one end of the band 15 is formed a perforation 16 adapting such end to fit over the bolt 6. The band is shaped so that it will encircle the tire, as represented in Fig. 1, and its upper or free end is perforated, as at 17, so that the locking pin 11 may be passed through such perforation. The extreme portion of the free end of the encircling band 15 is bent so that when brought to locking position as represented in Fig. 1 it lies between the upper parts of the flanges 8 of the clamp piece 7.

In using the invention as described, the tire and its rim are first slipped upon the holder or carrier 3, and the clamp 7 put in position upon the bolt 6. The encircling band 15 is then applied, as indicated in dotted lines in Fig. 1, the end perforated at 16 being slipped over the bolt 6; then the nut 10 is screwed upon the bolt 6, forcing the clamp in place and securing the tire rim upon its seat on the holder, and also securing the clamping band 15 at one end. The free end of the clamping band is then sprung into place from the position indicated in dotted lines, Fig. 1, to that shown in full lines, and then the locking pin 11 is inserted, passing through the apertures in the bracket 4, the clamp piece 7 and the free end of the encircling band 15, before it enters the lock casing.

It will be seen that a single key-operated lock, in the arrangement described, serves to secure the tire rim upon its holder and also to secure in place the encircling band 15 that serves to prevent the tire from being removed from the automobile, even should it be possible to remove it from its seat on the carrier 3.

Figure 5:
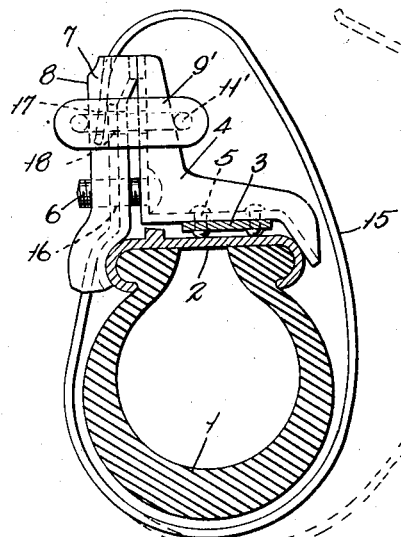
Fig. 5 is a side elevation illustrating a different embodiment of the invention.
Figure 6:
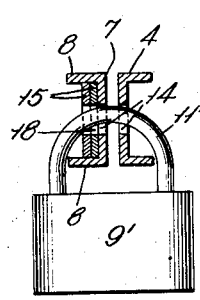
Fig. 6 is a sectional view taken on the line VI—VI of Fig. 5.

In the form of invention illustrated in Figs. 5 and 6 my invention has been designed to be used in connection with a pad lock. The same reference letters are used in these views as are employed in those that have been already referred to, so far as the parts shown are identical in the two forms of invention.

In Figs. 5 and 6 the casing of the padlock is designated 9' and the hasp thereof, 11', the latter corresponding in its functions to the removable pin 11 in the form of the invention first described. The hasp is arranged to pass through apertures 13, 14 and 17 formed respectively in the bracket, the clamp piece 7 and the free end of the encircling band, as has already been described in the first referred to form of invention. In this second form of the invention I prefer that the end of the encircling band, in which is formed the aperture 16 and which passes over the screw-threaded bolt 6, should be extended somewhat and perforated as indicated at 18 so as to be in alignment with the apertures 13, 14 and 17, as represented in Fig. 6.

The advantages incident to the form of invention first described are incident to the second form as well.

While I have represented as the preferred embodiment of my invention an arrangement in which that end of the encircling band designated 15' is the free end, it is evident that the conditions shown might be reversed and the end that passes over the screw-threaded bolt 6 be the free end, or the one last to be secured in position.

What I claim is:

1. In locking means for the spare tire of an automobile, the combination with a carrier on which a tire and its rim may be placed, a bracket secured to said carrier, and a clamp piece for engaging with the tire rim and holding it upon the carrier, of a free metal band for encircling the tire, and a key-operated lock arranged to unite the clamping piece and also both ends of the encircling band to the bracket and to retain these in operative positions.

2. In locking means for the spare tire of an automobile the combination with a carrier on which the wheel and its rim may be placed, a bracket secured to the carrier, a screw-threaded bolt extending from the bracket and a clamp piece arranged to engage with the tire rim and hold it upon the carrier, of a free metal band arranged to encircle the tire and prevent its removal, a nut to engage with the screw-threaded bolt and operating to hold one end of the encircling band and also to force the clamp in position to secure the spare tire on the carrier and a key-operated lock arranged to unite both the nut and the free end of the encircling band with the bracket and thus retain them in operative positions.

3. In locking means for the spare tire of an automobile, the combination of a carrier on which the tire and its rim may be placed, a bracket secured to the said carrier, a bolt extending outward from the bracket, a clamp piece holding the tire rim on the carrier, supported by the said bolt, a free metallic band for encircling the tire having one of its ends also supported by the said bolt, and a lock having a portion that engages with both the clamp piece and the free end of the encircling band when the latter is in position encircling a tire, and unites them to the brackets of the tire carrier.

4. In locking means for the spare tire of an automobile, the combination of a carrier on which the tire and its rim may be placed, a clamp piece having flanges at its edges whereby it is of channel form, arranged to engage with the tire rim and hold it in place on the carrier, a screw and nut for uniting the clamp piece to the carrier and forcing it into position to hold the tire rim, a metallic band for encircling the tire, the opposite ends of which are adapted to rest in the channel of the clamp piece, one end of the band being held in said channel by the screw and nut that forces the clamp piece into holding position, and a lock for uniting both the clamp piece and the free end of the encircling band to the carrier and preventing them from moving relative to each other and to the carrier.

5. The combination with a carrier on which the vehicle tire and its rim may be placed, a bracket secured to the carrier, a screw-threaded bolt extending outward from the bracket, a clamp piece adapted to be slipped over the bolt and engage with the edge of the tire rim to force it into place on the carrier, a lock casing provided with a projection that is screw-threaded and adapted to engage with the said bolt whereby it serves as a nut to force the clamp piece into holding position, a metallic band adapted to encircle the tire, one end being secured between the said nut and the clamp piece when the nut is screwed on to the bolt, the free end of the band being adapted to be brought into engagement with the clamp piece above the bolt, and a movable pin adapted to pass through aligning openings in the bracket, the clamp piece and the free end of the encircling band, and enter the lock casing where it is secured by the lock mechanism, the lock thus serving to hold in position to secure the tire both the clamp piece and the encircling band.

6. In locking means for the spare tire of an automobile, the combination with a carrier on which the tire and its rim may be placed, a bracket secured to the carrier and a bolt extending outward from the bracket, of a clamp piece supported by the bolt for holding the tire rim on the carrier, an elastic metallic band for encircling the tire having one of its ends supported by the bolt, and a lock having a portion that engages with the bolt to hold the clamp piece in position and to hold the said end of the band when the latter is in position encircling a tire, the opposite end of the band being also securely held.

CLARENCE A. GODSHALK.